(No Model.)  6 Sheets—Sheet 1.

W. E. BAILEY & R. D. BURNS.
SEWING MACHINE.

No. 573,382.  Patented Dec. 15, 1896.

Witnesses.  Inventors.

(No Model.) 6 Sheets—Sheet 3.

W. E. BAILEY & R. D. BURNS.
SEWING MACHINE.

No. 573,382. Patented Dec. 15, 1896.

(No Model.) 6 Sheets—Sheet 5.
W. E. BAILEY & R. D. BURNS.
SEWING MACHINE.

No. 573,382. Patented Dec. 15, 1896.

Witnesses.

Inventors.
William E. Bailey
and Robert D. Burns
by Alban Andrén
their atty.

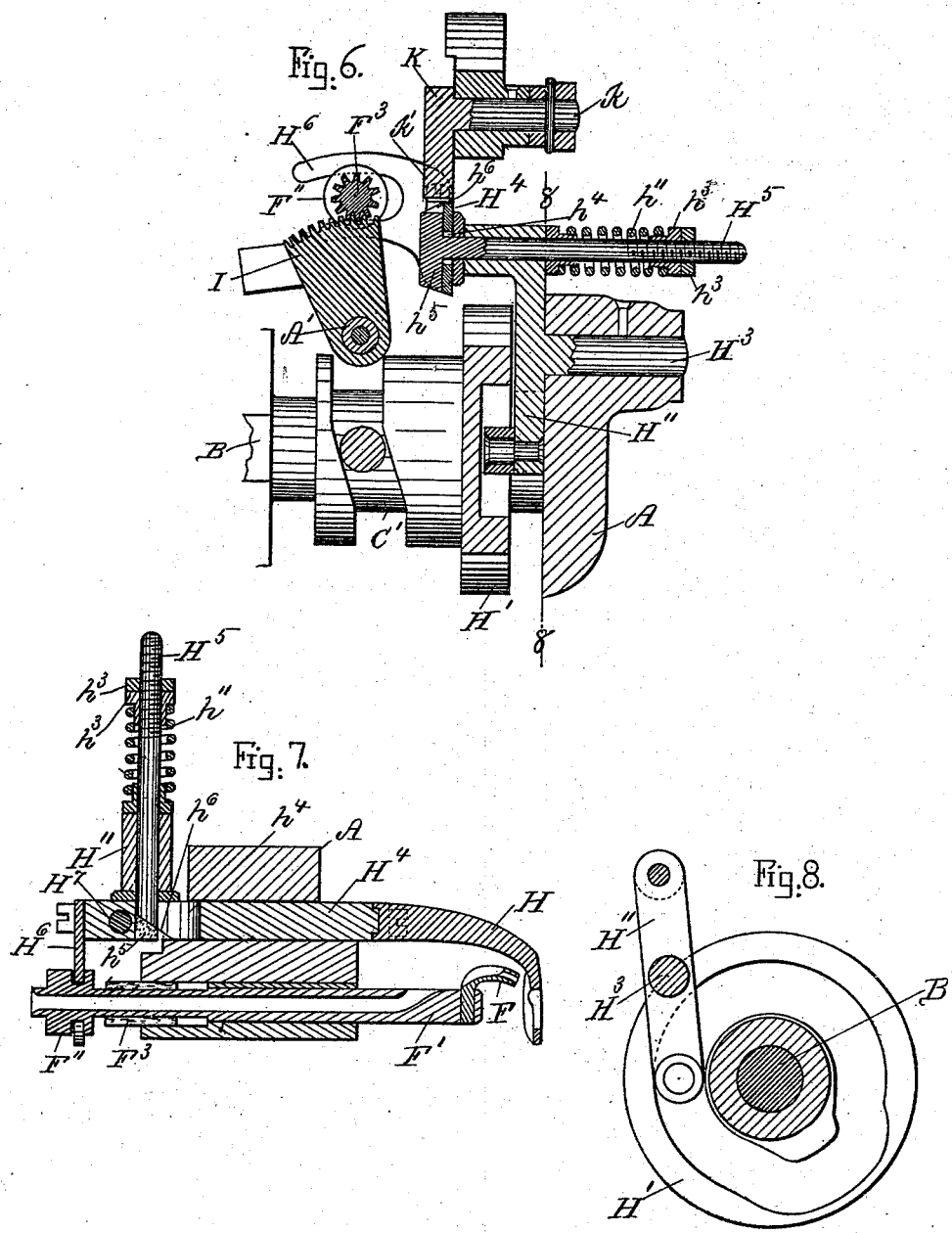

UNITED STATES PATENT OFFICE.

WILLIAM E. BAILEY, OF BEVERLY, AND ROBERT D. BURNS, OF WENHAM, MASSACHUSETTS, ASSIGNORS TO RUFUS H. WOODBURY, OF BEVERLY, MASSACHUSETTS.

SEWING-MACHINE.

SPECIFICATION forming part of Letters Patent No. 573,382, dated December 15, 1896.

Application filed July 30, 1894. Serial No. 518,932. (No model.)

*To all whom it may concern:*

Be it known that we, WILLIAM E. BAILEY, a resident of Beverly, and ROBERT D. BURNS, a resident of Wenham, in the county of Essex, State of Massachusetts, citizens of the United States, have invented new and useful Improvements in Wax-Thread Sewing-Machines, of which the following, taken in connection with the accompanying drawings, is a specification.

This invention relates to improvements in wax-thread sewing-machines, and it is carried out as follows, reference being had to the accompanying drawings, wherein—

Figure 1:
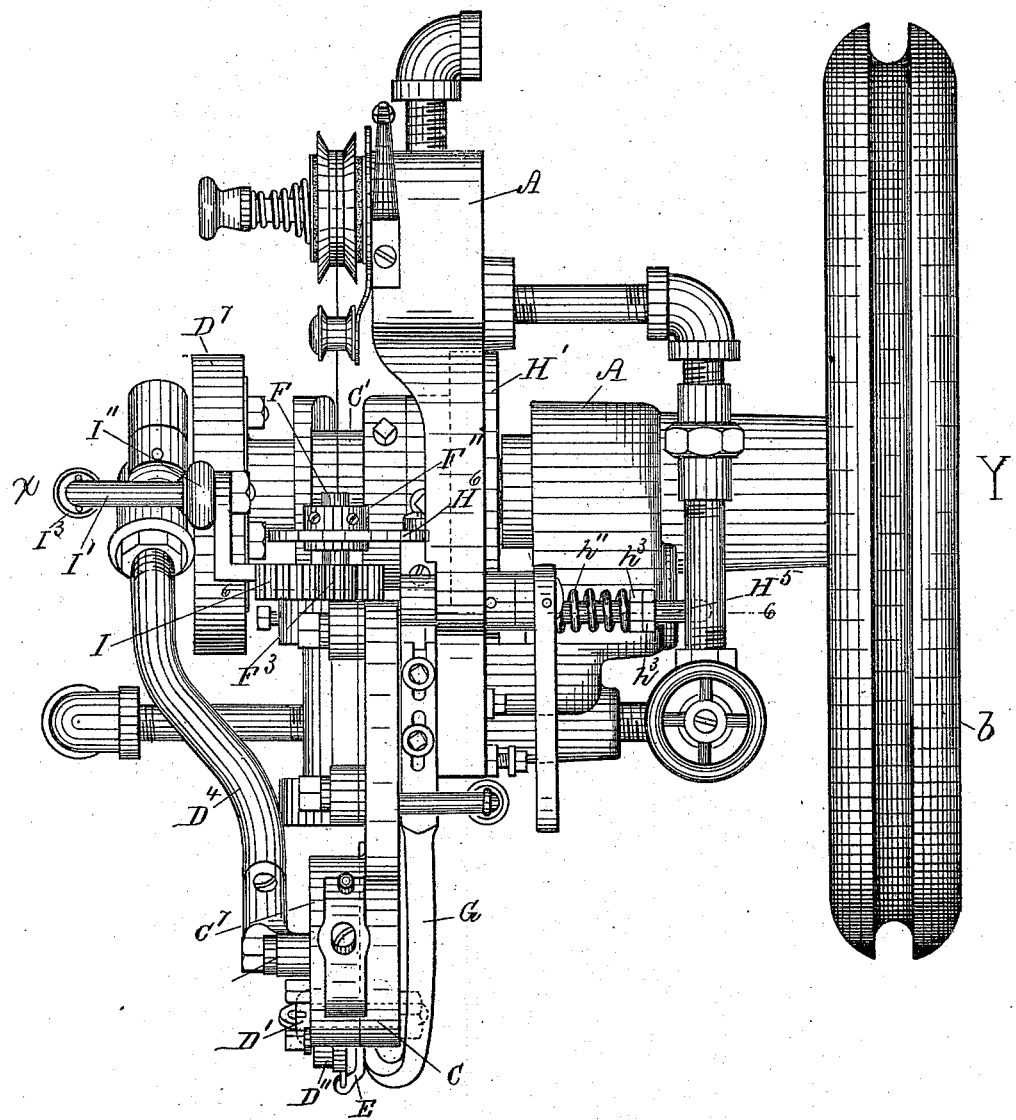
Figure 2:
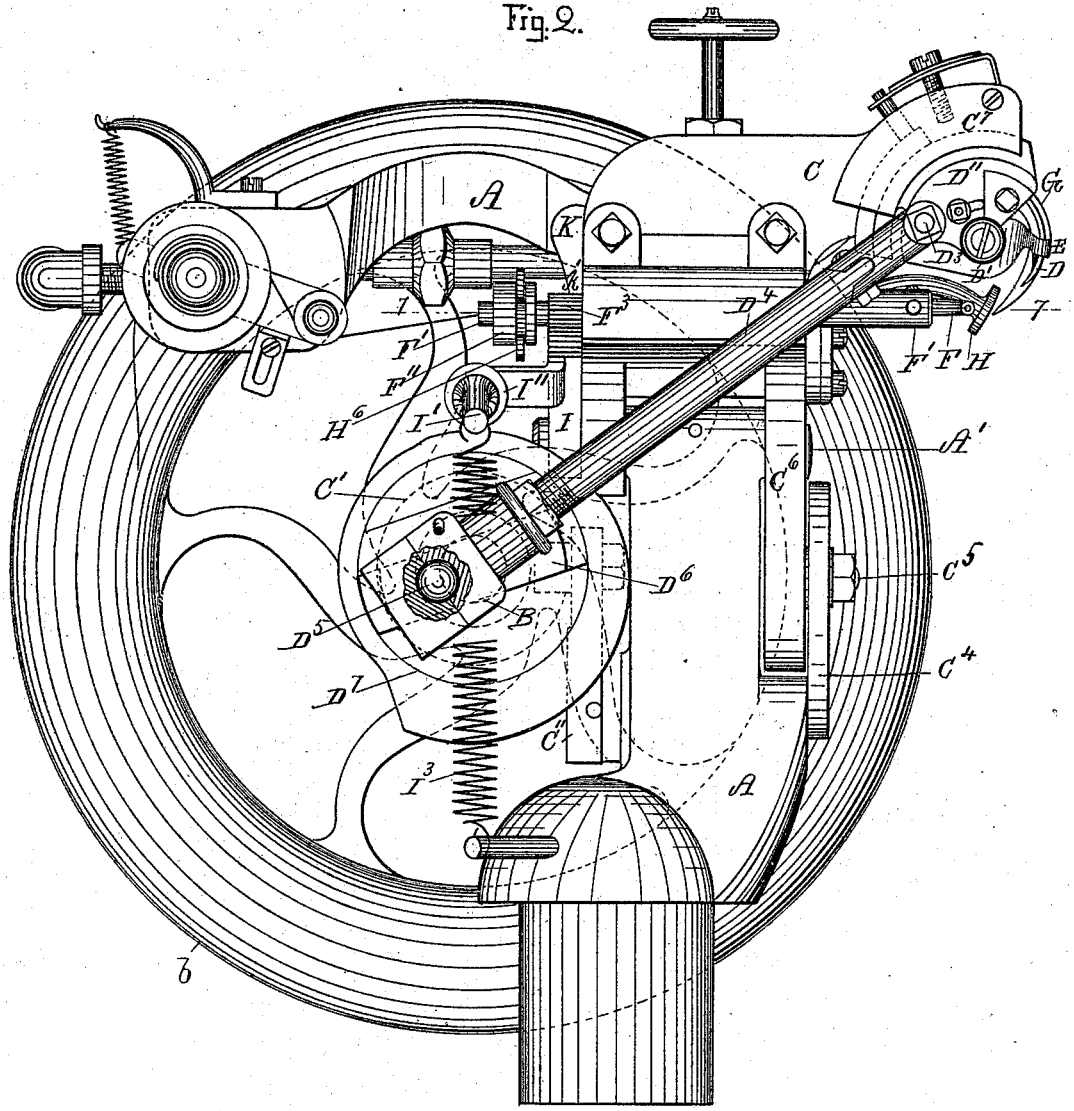
Figure 3:
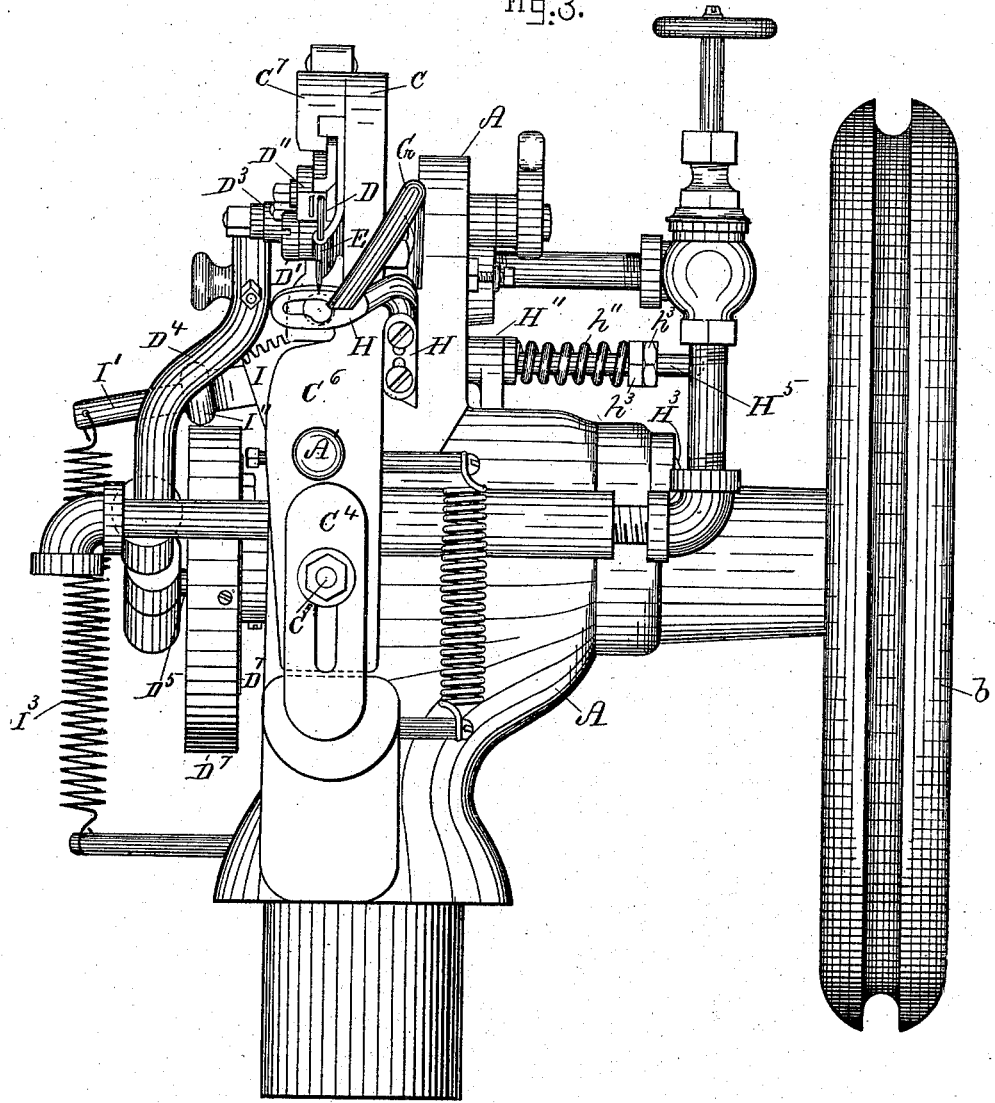
Figure 4:
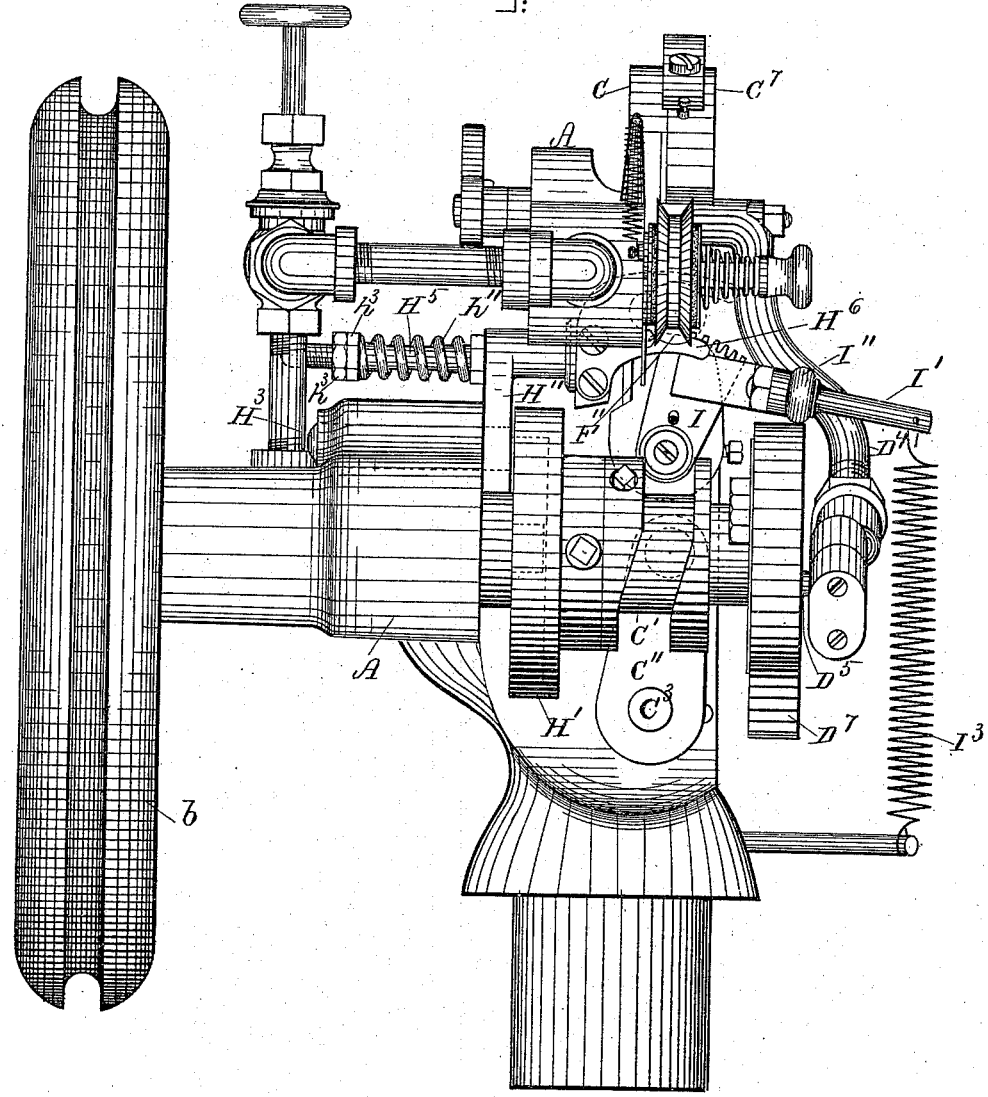
Figure 5:
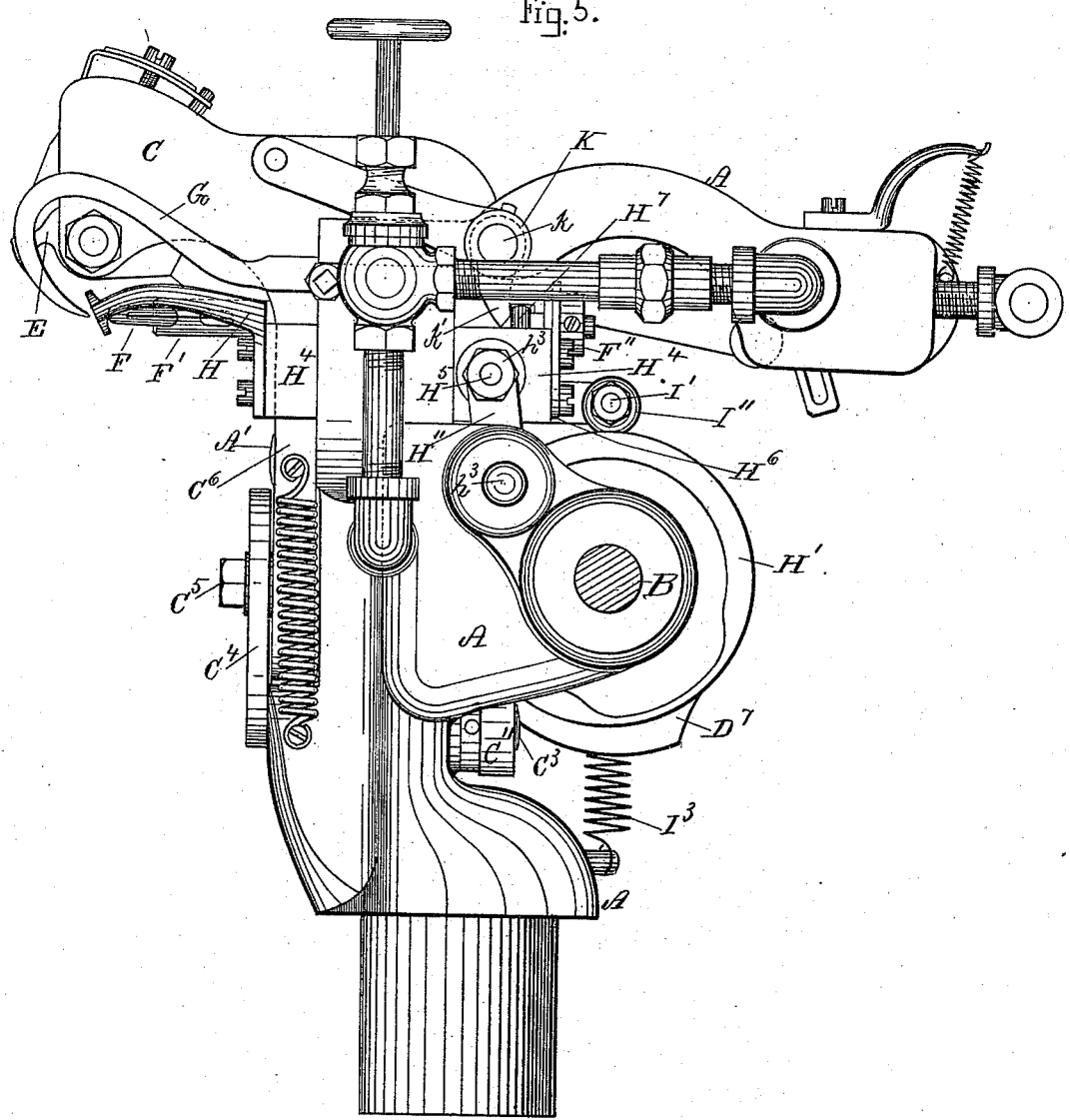

Figure 1 represents a top plan view of the complete machine. Fig. 2 represents a side elevation seen from X in Fig. 1. Fig. 3 represents a front elevation of the machine. Fig. 4 represents a rear elevation of the same. Fig. 5 represents a side elevation of the machine as seen from Y in Fig. 1, with the balance-wheel removed. Fig. 6 represents a detail sectional view on the line 6 6 shown in Fig. 1. Fig. 7 represents a detail sectional view on the line 7 7 shown in Fig. 2, and Fig. 8 represents a cross-section on the line 8 8 shown in Fig. 6.

Similar letters refer to similar parts wherever they occur on the different parts of the drawings.

A is the head of the machine, in bearings in which is journaled the driving-shaft B, to one end of which are secured a balance-wheel and pulley $b$, as usual.

To the frame A is pivoted at A' the rocking needle-feed arm C, which carries the curved hooked needle D, cast-off E, and rocking and longitudinally-movable looper F, as will hereinafter be more fully shown and described.

The needle-feed arm C is rocked by means of a grooved cam C', secured to the driving-shaft B. Said cam actuates a lever C'', secured to a shaft $C^3$, journaled in the head A, which shaft has secured to its forward end a slotted lever $C^4$, which is connected by means of an adjustable stud or pivot $C^5$ to a downwardly-extending lever $C^6$ on the needle-feed arm C, as shown.

In the forward end of the needle-feed arm C is pivoted at D' the needle-carrier D'', the side of which is adapted to bear against a cap-plate $C^7$ in the forward portion of the head C, so as to relieve the strain on the needle-carrier and its pivot while the needle is feeding the work.

To the needle-carrier D'' is pivoted at $D^3$ the jointed connecting-rod $D^4$, the lower end of which is universally pivoted to a crank $D^5$, which is secured in a suitable manner to a block $D^6$, which is adjustably secured in a groove in the cam-disk $D^7$, attached to one end of the driving-shaft B, as shown. The cast-off E is also pivoted and is intermittently rocked by the needle-carrier and intermittently held at rest by a friction device, as is usual in machines of this kind.

G is the stationary channel-opener, secured in an adjustable manner to the head A, as shown.

H is the longitudinally-movable work-supporting presser-foot, which is connected to the tubular looper-spindle F', so as to cause the latter and the work-supporting presser-foot H to move longitudinally in unison during the operation of the machine.

The mechanism for imparting a longitudinal motion to the work-supporting presser-foot and looper is constructed as follows:

On the driving-shaft B is secured a grooved cam H', which actuates a rock-lever H'', pivoted at $H^3$ to the frame A, as shown in Figs. 6, 7, and 8. The upper end of said lever H'' is adjustably connected to the presser-foot bar or carrier $H^4$, which is longitudinally movable in suitable guides in the frame A, and has secured to its forward end the work-supporting presser-foot H, as shown. The connecting mechanism between the rock-lever H'' and the presser-foot bar or carrier $H^4$ consists of a spring-pressed bolt $H^5$, going through a perforation in the upper end of the rock-lever H'', as well as through a slot-hole $h^4$ in the presser-foot carrier $H^4$, as shown in Figs. 6 and 7. The inner end of the bolt $H^5$ has a wedge-shaped head $h^5$, fitting in an inclined recess $h^6$ on the inside of the carrier $H^4$, as shown in Fig. 7. The bolt $H^5$ is surrounded outside of the lever H'' with a coiled spring $h''$, the tension of which may be adjusted by means of regulating-nuts $h^3$ $h^3$, as shown in Figs. 6 and 7, and by the arrangement the presser-foot is adapted to yield slightly during its forward motion to compensate for inequalities in the thickness of the work that is being operated upon. It will be seen that as the presser-foot carrier-bar H⁴ is moved forward by the rock-lever H″ as the presser-foot comes in contact with the work and the rigid channel-opener holding it the inclined head h⁵ is capable of rising slightly in the inclined recess h⁶ by the influence of the yielding spring h‴, thus holding the presser-foot with a yielding pressure against the work.

The tubular looper-spindle F′ is connected to the presser-foot carrier H⁴, so as to cause said parts to move longitudinally together during the stitching operation, and for this purpose the following connecting mechanism is preferably employed, namely: The rear end of said tubular looper-spindle F′ is enlarged and provided with an annular groove F″, and to the rear end of the presser-foot carrier H⁴ is secured a forked plate H⁶, having its forked end portions guided in the groove of the collar F‴, as seen in Figs. 1, 2, 4, 5, 6, and 7, and it will thus be seen that the looper-spindle is caused to move longitudinally forward and back with the presser-foot carrier H⁴. In mechanisms of this kind it is essential that an oscillating movement should be imparted to the looper for the purpose of laying the thread in the hooked end of the curved needle after the latter has penetrated the work, and it is also essential that such laying of the thread in the hooked end of the needle should be done very quickly to prevent the withdrawal of the needle in forming the stitch, and for this purpose we employ the following connecting mechanism:

On the rear end of the pivot A′ is loosely journaled a gear-segment I, the teeth of which mesh in the teeth of a pinion F³ on the rear end of the looper-spindle F′. The gear-segment I has at one side an extension, to which is secured a spindle I′, on which is loosely journaled a roller I″, which rolls on the periphery of the cam D⁷, secured to the driving-shaft B, as shown.

The roller I″ is held in contact with the cam D⁷ by the influence of a spring I³, secured in one end to the roller-spindle I′ and in the other to the lower end of the frame A or a projection thereon, as shown in the drawings. By this arrangement an oscillating motion is imparted to the looper-spindle around its axis by the engagement of said segment-gear with the pinion on said looper-spindle for the purpose mentioned.

K is a lever pivoted at k and having a tooth k′ secured to it and adapted to engage with a tooth or projection H⁷ on the presser-foot carrier H⁴ when the forward end of said lever K is depressed either by hand or foot pressure for the purpose of withdrawing the presser-foot from the channel-opener previous to placing the shoe in position for sewing or removing it from the machine after the work is finished.

To insure the looper placing the thread in the eye or barb of the needle with reliability, it is necessary that the looper when it performs the first part of its oscillatory movement be as near the presser-foot as possible, and the presser-foot and looper-spindle are therefore connected together and move longitudinally in unison in the manner described. Such arrangement also insures the looper moving back with the presser-foot when the latter moves back to allow the work to be moved to receive the next stitch, and thus prevents the presser-foot from striking the looper.

The machine is provided with the usual tension, take-up, and wax-thread-heating devices, which need not here be explained in detail.

In connection with the machine may be used any well-known form of a welt-guide whenever it is desired to use it for welt-sewing purposes.

For sewing turned shoes the operation is as follows: The lasted shoe, having a channeled insole, is held by the operator in position so that the upper is made to rest against the work-supporting presser-foot and the channel-opener inserted in the channel of the insole, after which the machine is set in operation, causing a single chain-stitch to be made through the bottom of the channel of the insole, the upper, and welt, if used, and during such operation the needle enters and perforates the work, feeds it the required distance, while the looper lays a loop in the hooked portion of the needle, after which the looped thread is drawn through the work by the needle and carried to its original position, by which a chain-stitch is formed by the coöperation of the cast-off, and so on successively until the entire outer portion of the insole and upper have been united, when the work-supporting presser-foot is moved by hand or foot pressure away from the work and channel guide to permit the easy removal of the sewed shoe from the machine, after which another shoe to be sewed is placed in position, as above mentioned.

What we wish to secure by Letters Patent, and claim, is—

1. In a sewing-machine, the combination of a stationary frame, a rocking carrier, a needle, cast-off, and looper carried thereby, a stationary channel-opener, a longitudinally-movable work-supporting presser-foot, and a longitudinally-movable looper-spindle connected to the work-supporting presser-foot, substantially as and for the purpose set forth.

2. In a sewing-machine, the combination of a stationary frame having a stationary channel-opener and a longitudinally movable and yielding work-supporting presser-foot, a rocking head carrying a needle, cast-off, and looper, a looper-spindle pivoted and guided in said head and connected to the presser-foot bar, and intermediate connecting mechanism, substantially as described, for actuating said parts from the driving-shaft of the machine, for the purpose specified.

In testimony whereof we have signed our names to this specification, in the presence of two subscribing witnesses, on this 2d day of June, A. D. 1894.

WILLIAM E. BAILEY.
   ROBERT D. BURNS.

Witnesses:
 ALBAN ANDRÉN,
 SETH T. THACHER, Jr.